United States Patent [19]

Dodds et al.

[11] Patent Number: 4,677,646
[45] Date of Patent: * Jun. 30, 1987

[54] DATASET POWERED BY CONTROL AND DATA SIGNALS FROM DATA TERMINAL

[75] Inventors: David E. Dodds; Ludo Bertsch, both of Saskatoon, Canada

[73] Assignee: Develcon Electronics Ltd., Saskatoon, Canada

[*] Notice: The portion of the term of this patent subsequent to Aug. 6, 2002 has been disclaimed.

[21] Appl. No.: 761,390

[22] Filed: Aug. 1, 1985

Related U.S. Application Data

[63] Continuation of Ser. No. 467,014, Feb. 16, 1983, Pat. No. 4,534,039.

[30] Foreign Application Priority Data

Feb. 26, 1982 [GB] United Kingdom ............... 8205660

[51] Int. Cl.⁴ ............................................. H04B 3/44
[52] U.S. Cl. ........................................ 375/36; 379/93; 379/348
[58] Field of Search ......... 375/36; 340/310 R, 310 A; 333/15, 16; 179/170 J, 2 DP; 455/343; 379/93, 348

[56] References Cited

U.S. PATENT DOCUMENTS

| | | | |
|---|---|---|---|
| 2,777,057 | 1/1957 | Pankove | 455/343 |
| 2,918,573 | 12/1959 | Hollmann | 455/343 |
| 3,435,358 | 3/1969 | Rheinfelder | 179/170 J |
| 3,748,411 | 7/1973 | Heyes et al. | 179/170 J |
| 3,835,334 | 9/1974 | Notteau | 179/170 J |
| 4,534,039 | 8/1985 | Dodds et al. | 375/36 |

*Primary Examiner*—Robert L. Griffin
*Assistant Examiner*—Stephen Chin
*Attorney, Agent, or Firm*—Adrian D. Battison; Stanley G. Ade

[57] ABSTRACT

A dataset apparatus is powered by voltages extracted from electrical signals passing between the data terminal apparatus and the dataset by circuits comprising a capacitor and diode combination. The transmitter of the dataset includes capacitance isolation of the signal from the transmission lines by applying an oscillated voltage and an inverted oscillated voltage dependent upon the signal to capacitors in a first circuit to charge the capacitors through a diode whereby the oscillating voltage causes the capacitors to discharge through a second path formed by further diodes to charge a pair of capacitors coupled across the transmission lines. A second circuit of similar impedance to the first charges the capacitors to the opposite polarity. The arrangement can handle high common mode voltages on the transmission lines. The receiver of the dataset includes a doubly balanced resistance bridge network connecting the transmission lines to a differential amplifier, the circuit being balanced such that signals from the transmitter are not applied to the amplifier and also common mode signals are not applied to the amplifer.

11 Claims, 3 Drawing Figures

DATASET POWERED BY CONTROL AND DATA SIGNALS FROM DATA TERMINAL

BACKGROUND OF THE INVENTION

This application is a continuation of our copending application Ser. No. 467,014 filed Feb. 16, 1983 and to be issued on Aug. 6, 1985 as U.S. Pat. No.: 4,534,039.

This invention relates to new and useful improvements in dataset apparatus for data transmission systems. Dataset apparatus, otherwise known as data communication equipment (DCE) or sometimes as a modem, is widely employed for the interconnection of two or more remote units of data terminal equipment (DTE) such as computers, printers and video terminals. The dataset apparatus is customarily located with and connected to the data terminal equipment and is interconnected to a further dataset apparatus by transmission lines which may, for example, be telephone cables.

Heretofore, dataset apparatus has been powered by a separate connection to the mains supply voltage at the prevailing local level. Thus, the dataset apparatus has been conventionally of considerable size and therefore it has generally been a fairly expensive item in the terms of manufacturing costs and has also required considerable physical space in the area of the terminal equipment.

SUMMARY OF THE INVENTION

It is one object of the present invention to provide a dataset apparatus which avoids the necessity of a mains voltage supply thereto.

According to the invention therefore there is provided a data communication apparatus comprising a data terminal apparatus including means for at least one of emitting and receiving electrical signals which contain digital information, a dataset apparatus for modifying and controlling signals passing between transmission lines and said data terminal apparatus, and means for extracting electrical power from said data terminal apparatus so as to provide power supply voltages for said dataset apparatus.

According to a second aspect of the invention there is provided a dataset apparatus comprising connector means for attachment to data terminal apparatus for receiving therefrom and supplying thereto electrical signals, terminal means for connection to transmission lines, means for modifying and controlling signals passing between connector means and said terminal means and extraction means for extracting from at least one of said electrical signals electrical power so as to provide power supply voltages for said modifying means.

It is one advantage of the invention therefore that the dataset apparatus can be directly powered from the connector between the dataset apparatus and the data terminal. More specifically, according to a preferred embodiment, the dataset apparatus includes a connector manufactured according to standard RS-232-C of the Electronic Industries Association. This standard is well known in the industry and provides a multiple cable connector of 25 wires and specifies the function of the particular wires.

It is a further advantage of the present invention that it can comprise a small printed circuit board constituting merely an extension of the 25-wire connector defined above. The case or enclosure required therefore is very small and can be manufactured very economically.

It is a yet further advantage of the invention that, in view of the simplification of the circuitry, no power transformer, power supply cord or 25-wire data terminal cable is required.

With the foregoing in view and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention in which:

DESCRIPTION OF THE DRAWINGS

In the drawings like characters of reference indicate corresponding part of the different figures.

DETAILED DESCRIPTION

Figure 1:
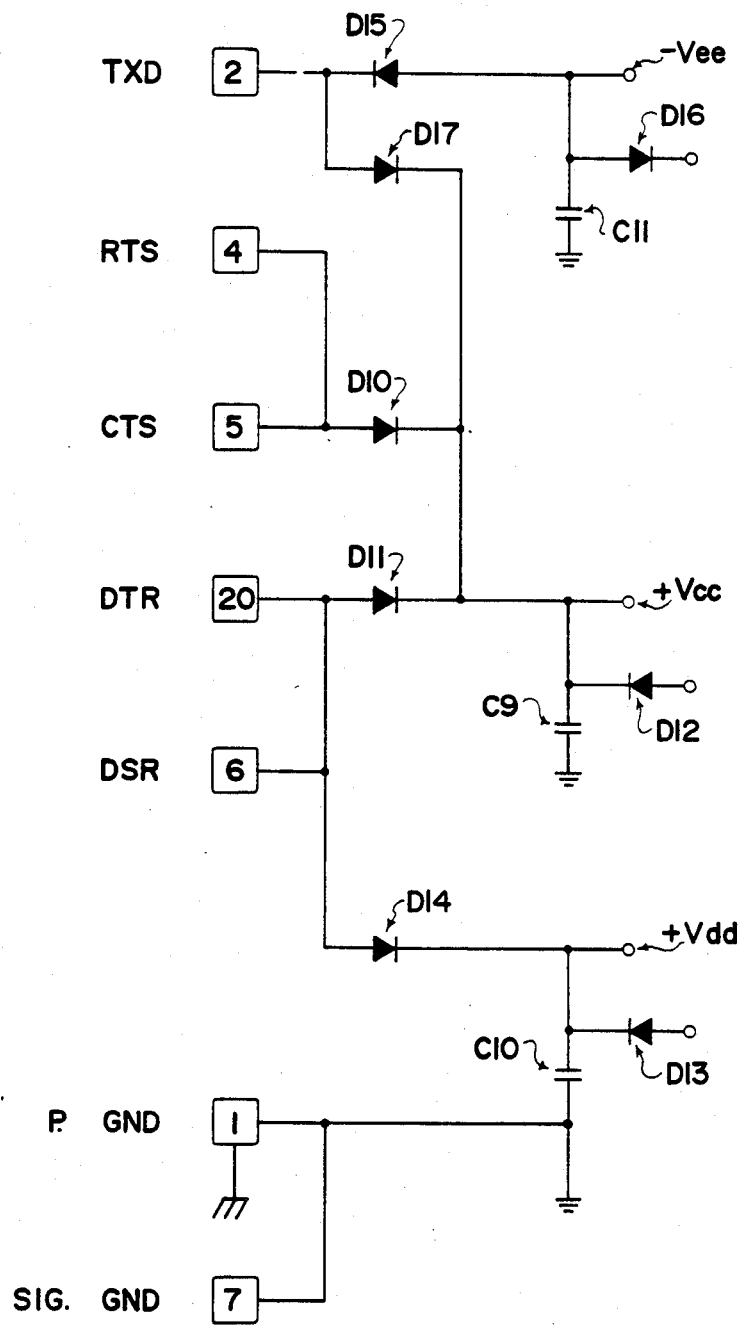
FIG. 1 is a schematic diagram of part of the circuitry of a dataset apparatus according to the invention showing some of the terminals for connection to the data terminal and circuitry for developing power supply voltages for the dataset apparatus.
Figure 2:
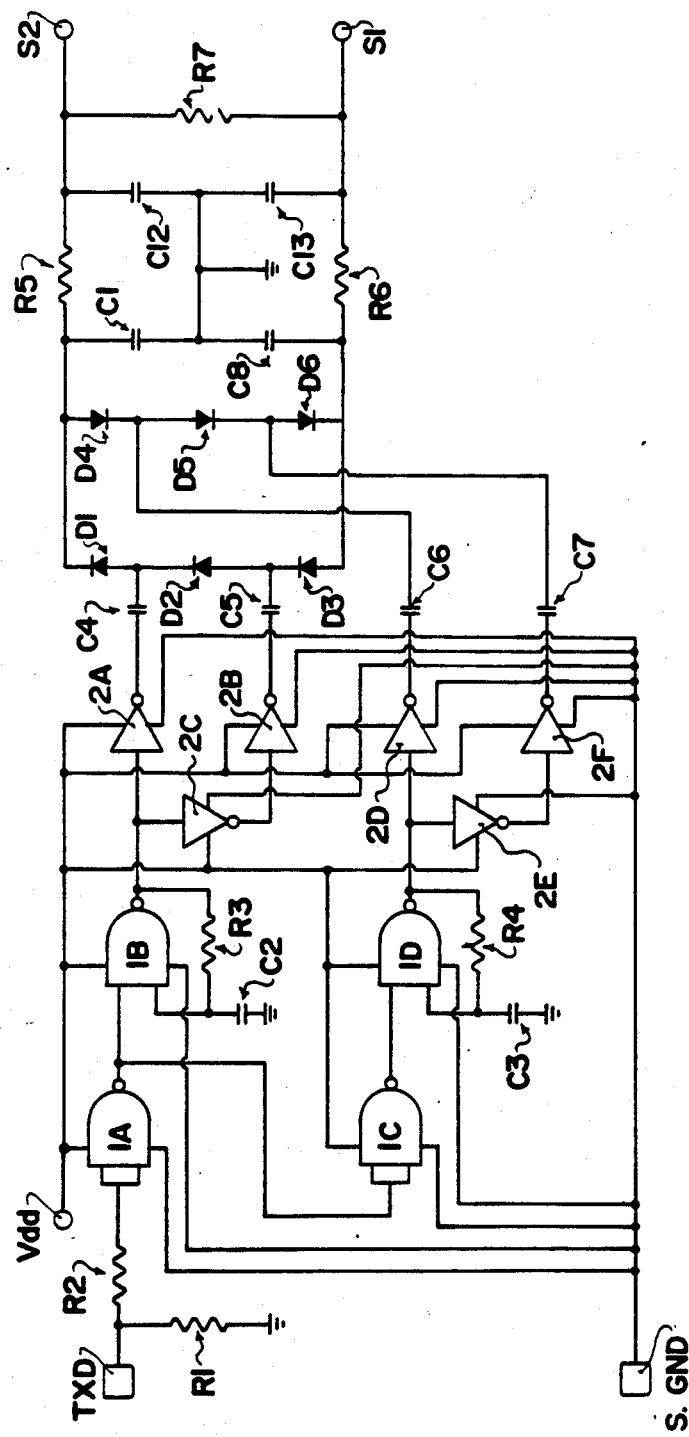
FIG. 2 is a schematic diagram of the transmitter circuitry of the dataset apparatus of FIG. 1.
Figure 3:
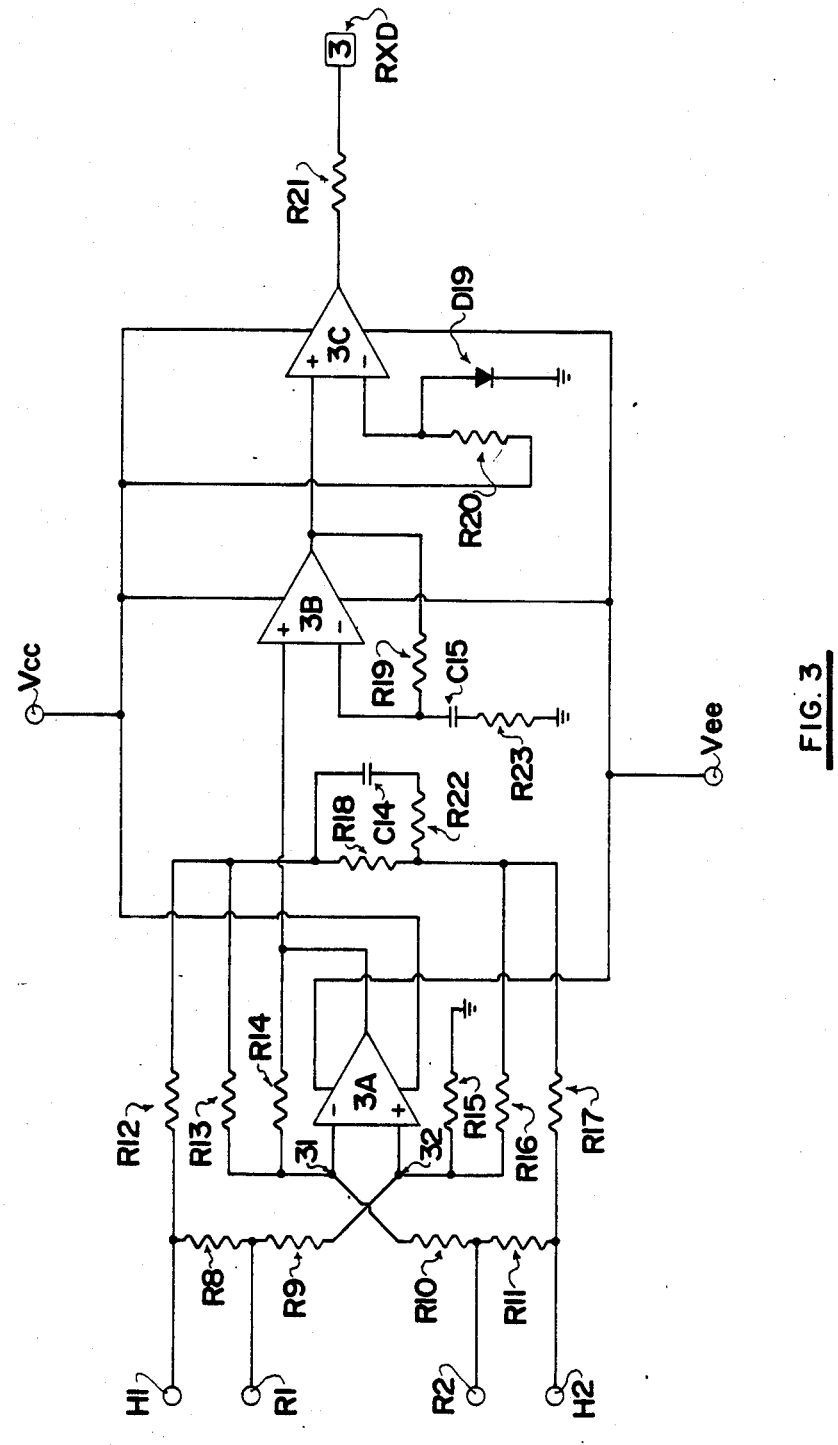
FIG. 3 is a schematic diagram of the receiver circuitry of the dataset apparatus of FIG. 1.

A dataset apparatus is schematically illustrated in FIGS. 1, 2 and 3, each figure showing a separate part of the apparatus with the details of the terminals, housing and mounting arrangements being omitted as these will be apparent to one skilled in the art.

As is known, the connection between the data terminal equipment and the data set apparatus includes a number of separate wires carrying signals between the two pieces of equipment. These are the data signals and the control signals necessary for developing and controlling the information transmitted along the lines. Some of these wires are shown on the left hand side of FIG. 1 as follows:

TXD refers to the data signal emanating from the data terminal equipment which is transmitted to the data set and contains the information which the user requires to send along the line.

RXD relates to data signals emanating from the data set which contains information received on the line for communication to the data terminal equipment for study by the user.

DTR is a control signal which controls or enables transmission of data into the data set. With DTR off, TXD will not be sent onto the line. With DTR on, TXD will be sent onto the line.

RTS relates to a control signal which is sometimes employed as an additional control signal emanating from the data terminal equipment to control the transmission of TXD onto the line dependent also upon CTS changing from off-state to on-state.

CTS is a signal developed by the dataset and is required by some data terminal equipment before they transmit the TXD signal since the signal indicates the data link is available.

P.GND is a connection from the dataset directly to earth ground and the chassis of the data terminal equipment. This is used for protection against shock hazards.

S.GND relates to the signal ground to which all other signals are referenced.

In view of the fact that the above signals are conventional in their operation and use, no disclosure is made here of the details thereof except to note that terminals are available in the dataset apparatus at which said signals are applied. The terminals are shown in FIG. 1, from which it can be noted generally that the device is powered by the signals available at the stated terminals. The input positive and negative signal peak voltages are captured by a diode-capacitor network and the capacitors supply charge for the time duration between peak voltages. The voltages are supplied at the terminals VCC, VDD and VEE.

Specifically, TXD is connected to terminal VEE through a rectifying diode D15 between which line and signal ground is connected a capacitor C11. Similarly, TXD is connected to VCC through a rectifying diode D17 between which line and signal ground is connected a capacitor C9. When TXD reaches mark minus voltage, diode D15 conducts and capacitor C11 is charged. Conversely, when TXD reaches space plus voltage, diode D17 conducts and capacitor C9 is charged. Thus, the peak negative voltage appears at terminal VEE as a negative voltage and during the time duration between the peak negative voltages, capacitor C11 discharges from the terminal VEE through the circuitry described hereinafter. The voltage at terminal VEE is therefore maintained at a relatively constant negative voltage. It is possible in some circumstances to connect to terminal VEE through a rectifying diode D16, an optional 6 VAC input. This acts to charge the capacitor C11 in the same way as the signal voltages TXD to assist in maintaining a constant negative voltage at the terminal VEE.

In similar manner, peak positive voltages from TXD appear at the terminal VCC and the capacitor C9 maintains a relatively constant positive voltage at the terminal VCC during the time duration between the peak voltages. Again, the optional 7 VAC input can be applied to the terminal VCC through a rectifying diode D12.

The signal RTS is also applied to the terminal VCC through a rectifying diode D10 and is used in the same manner. It will be appreciated that diode D11 prevents signal RTS from reaching terminal VDD. Similarly, DTR is connected to VCC through a diode D11. Thus, RTS TXD and DTR act to charge capacitor C9 to maintain the positive voltage at the terminal VCC.

DTR is also connected to terminal VDD through the diode D14. This acts in the same way as explained above to maintain, in combination with the capacitor C10, a positive voltage at the terminal VDD. The optional 6 VAC input can also be applied through a further diode D13 to the terminal VDD if required.

S.GND is connected to the ground side of the capacitor C10.

Referring briefly to FIG. 2, the voltage at the terminal VDD is applied to each of the integrated circuits 1A, 1B, 1C, 1D and 2A, 2B, 2C, 2D, 2E and 2F. The ground potential at S.GND is connected also to the integrated circuits enumerated above. Thus, the transmitter circuit, as will be described in detail hereinafter, is powered by the voltage VDD generally without the use of further power voltage supply although the 6 VAC optional input may be employed in some circumstances. It will be noted particularly that the transmitter circuit disclosed in FIG. 2 is enabled only by the signal DTR and in the absence of that signal, will fail to transmit. Thus the signal DTR isssuing from the data terminal equipment acts to control transmission of data TXD and in the absence of that signal from the data terminal equipment, no data signal TXD will be transmitted.

Referring also briefly to FIG. 3, voltage VCC is supplied as a power voltage to amplifiers 3A, 3B and 3C and negative voltage VEE is used as a negative power supply to the amplifiers 3A, 3B and 3C. Thus the receiver as will be explained in more detail hereinafter, is enabled by any of the signals TXD, RTS or DTR.

Turning now to the transmitter circuit shown schematically in FIG. 2, data signals TXD received from the data terminal equipment are received at terminal TXD of the dataset apparatus. The voltage TXD is terminated by the resistor R1 and is applied through current limiting resistor R2 to integrated circuit IC1a which acts as a buffer. IC1b and IC1d operate as high frequency oscillators that are controlled by one of their inputs. The output from IC1a is applied directly to IC1b and is applied to IC1d through an inverter IC1c. Thus, when TXD is in the positive or space state, it disables oscillator IC1b and enables oscillator IC1d.

More specifically, each of the Schmitt NAND circuits 1b and 1d function as oscillators controlled by a feed-back loop including a resistor and a capacitor R3, C2 and R4, C3 respectively. With TXD in the positive or space state, a high voltage is applied to one input of the circuit 1d enabling that oscillator. Assuming a low voltage is present at the junction of capacitor C3 and resistor R4 the output from the circuit 1d will be a high voltage. The high voltage, after a time determined by R4 and C3, will be applied to the other input of the circuit 1d thus causing the output to drop. The low voltage output after a time determined by R4, C3 and the hysteresis of circuit 1d will cause the output to rise and consequently, with TXD at a space, the output from circuit 1d will oscillate at a rate determined by R4 and C3. When TXD is in the negative or mark state, the output of circuit 1b oscillates at a rate dependent upon R3 and C2 while the output from circuit 1d remains low.

It will be noted that the output from circuits 1b and 1d is applied to two symmetrical circuits including inverter/buffers 2A through 2F, capacitors C4 through C7, diodes D1 through D6 and capacitors C1 and C8. The following description will refer only to the output from circuit 1d but it will be appreciated that circuit 1b operates in a symmetrical manner.

The output from circuit 1d is applied to the inverter/buffer 2d and to the inverter/buffer 2f through the inverter/buffer 2e. Thus, the outputs from 2d and 2f follow the oscillating output of the circuit 1d but one is 180° out of phase with the other. Assuming C6 and C7 initially have 0 voltage across them and assuming the output from 2d initially switches from low to high and conversely the output from 2f switches from high to low, since the voltage across C6 and C7 cannot change instantaneously, the other terminals of C6 and C7 follow the change in outputs of IC2d and IC2f. The voltage difference across the diode D5 approaches 0.7 volts and the diode begins to conduct. The capacitors charge until their added voltage equals the voltage difference between IC2d and IC2f minus one diode drop. The capacitors have now been charged. Under control of the oscillating output from 1d, the output from 2d then switches from high to low and the output of IC2f switches from low to high. Since the voltage across C6 and C7 cannot change instantaneously, the other terminals of C6 and C7 follow the change in outputs IC2d and IC2f. As the voltage difference across D5 reverses polarity, the charges stored in C6 and C7 flows through the circuit including D4 and D6 and charges capacitors C1 and C8.

The process then repeats itself. Diode D5 charges up C6 and C7 by the voltage difference in the outputs of 2d and 2f following which C1 and C8 are charged up from the charges set up by C6 and C7. Diodes D1, D2 and D3 limit the net total voltage on capacitors C1 and C8 to a maximum of three diode drops which is approximately 2.1 volts.

As explained previously, when TXD is mark, the output from 1b oscillates and 1d is disabled, that is the output remains constant. As the circuit from the output of 1b is symmetrical to that of 1d but opposite, capacitors C1 and C8 are similarly charged to a voltage of 2.1 V except that the polarity is reversed.

As the circuits are symmetrical, each presents a similar source of impedance to the ground for each terminal s1, s2 and hence for each wire of the transmission line.

The voltage across the capacitors C1 and C8 is applied to the transmission lines connected at S1 and S2. Resistors R7, R5 and R6 act to divide the voltage across the capacitors C1 and C8 so that the voltage across S1 and S2 is reduced to 0.7 volts which is compatible to signal levels expected on telephone lines.

Capacitors C12 and C13 connected across the lines to ground act together with resistors R5 and R6 to provide a first order filter which removes a portion of the high frequency content which could otherwise cause substantial induced voltage in other neighboring wire pairs. The resistor R7 also provides a matching terminating resistance to the wire pair which typically would be several miles long.

As the transmission wires at S1 and S2 are separated from the oscillators 1B and 1D and the input terminal TXD by small capacitors C4 through C7, the transmitter can handle hundreds of volts of common mode voltage. Furthermore, the voltage present at the output capacitors C1 and C8 is effectively isolated from the input signal and is differential and balanced to ground.

In a four-wire transmission line system, the terminals S1 and S2 can be directly connected to the transmission pair of the four-wire system. Alternatively, the transmission terminals S1 and S2 can be connected to terminals H1 and H2 in the receiver of FIG. 3 for use with a two-wire system.

Turning therefore to FIG. 3, when used with a four-wire system, the transmission pair is connected at S1 and S2 and the receiver pair at R1 and R2. When converting from a four-wire to a two-wire system, the two-wire pair is connected at R1 and R2 and the terminals S1 and S2 are connected to terminals H1 and H2.

Describing the apparatus of FIG. 3 in conjunction with a two-wire system therefore, a balanced bridge arrangement is provided by the resistors R8 through R18, capacitor C14 and resistor R22. The output from the balanced bridge arrangement is applied at summing junction terminals 31 and 32 of a differential amplifier 3A. The resistance bridge arrangement is balanced firstly in that the resistance-capacitor balancing load R18, C14 and R22 is arranged to closely approximate the impedance of the pair of lines connected to the terminals R1 and R2. Secondly, the bridge arrangement is balanced such that the impedance between each of the terminals R1 and R2 and ground is the same; the impedance between each of the terminals H1 and H2 and ground is the same; the impedance between each of the terminals R1 and R2 and inputs 31 and 32 is the same; and similarly the impedance between each of the terminals H1 and H2 and the inputs 31 and 32 is the same.

When a transmission signal is applied at the terminals H1 and H2 by the transmitter of FIG. 2, equal currents flow through two voltage dividers of similar impedance. The first comprises R12, the balancing impedance of R18, R22 and C14, and finally R17. The second comprises R8, the transmission pair between R1 and R2 and R11. The transmitted signal is not however seen at the input terterminals 31 and 32. This occurs because the line differential voltage and the balance impedance differential voltage are both connected to the summing inputs 31 and 32 of the summing differential amplifier 3a. The differential line voltage is connected by R9 and R10 to the inputs 32 and 31 respectively and the balance impedance voltage is connected to the inputs 31 and 32 by R13 and R15. Connections from the line voltage to the differential amplifier have been reversed so that this voltage is subtracted from the balance impedance voltage. Thus, the differential amplifier amplifies the difference of the two differential voltages, which is effectively zero for transmitted signals.

Because the termination impedance connected to the terminals R1 and R2 is the same and also the impedance between the terminals R1 and R2 and the inputs 31 and 32 is the same, common mode voltages do not cause a differential voltage to be applied across the inputs 31 and 32 and hence they are ignored by the amplifier 3a. If common mode signals were presented to an unbalanced termination, differential voltages would result at the amplifier 3a and hence would result as an output from the receiver at the RXD terminal.

More specifically, terminal R1 sees ground through resistors R9 and R15 and sees the input 32 through resistors R9. Terminal R2 similarly sees an effective ground at the output of the amplifier 3a through the resistors R10 and R14. The reistance value therefore between R1 and ground and R2 and ground is the same and that between R1 and input 32 and R2 and input 31 is the same.

The same balanced condition applies to terminals H1 and H2 so that if the receiver is used with a four-wire system, any common mode signals appearing at H1 and H2 similarly do not provide a faulty output from the receiver.

Any differential signal received at the terminals R1 and R2 either in a two-wire or a four-wire system is seen as a differential voltage at the inputs 31, 32 and is amplified by the amplifier 3a. The amplifier signal is then equalized in conventional manner to compensate for high frequency losses of the transmission wires using an amplifier 3b, resistor R19, capacitor C15 and resistor R23 connected to ground. The equalized signal is then presented to a conventional slicing circuit which acts to produce higher voltage positive and negative signals to drive the data terminal equipment attached at the RXD terminal. The slicing circuit comprises an amplifier 3C, resistor R20 and rectifier D19.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Data communication apparatus of the type comprising a data terminal apparatus for developing electrical data signals and a dataset apparatus for modifying and controlling the data signals prior to transmission along transmission lines, said data terminal apparatus including means for developing said electrical data signals and means for developing control signals and separate terminal connectors at which said data signals and control signals are presented, said dataset apparatus including separate terminal connectors for receiving said separate data signals and control signals and power supply means connected to a plurality of said terminal connectors for receiving said data signals and control signals so as to extract, solely from said control and data signals, power supply voltage for said dataset apparatus.

2. Apparatus according to claim 1 including capacitor storage means for storing a positive voltage extracted from said signals.

3. Apparatus according to claim 1 wherein said power supply means is arranged to extract a positive voltage and a negative voltage and wherein there is provided capacitor storge means for storing said positive and negative voltages.

4. Apparatus according to claim 1 wherein the power supply means comprises a diode connected to said emitting means and a capacitor one plate of which is connected to ground and the other plate of which is connected to a voltage supply terminal, whereby a voltage applied to said diode charges the capacitor thus producing a voltage at said supply terminal.

5. Apparatus according to claim 1 wherein the power supply means comprises a plurality of diodes and a corresponding plurality of capacitors, the diodes and capacitors being arranged such that the capacitors are charged so as to produce a plurality of different voltages of which at least one is positive and at least one is negative.

6. Dataset apparatus comprising first terminal means including a plurality of separate terminal connectors for attachment to data terminal apparatus for receiving therefrom and supplying thereto at respective ones of said separate terminal connectors electrical data signals and electrical control signals, second terminal means for connection to transmission lines, means for modifying and controlling electrical data signals emitted from said terminal apparatus prior to transmission on said transmission lines as transmitted data signals and electrical data signals received from said transmission lines prior to transmission to said terminal apparatus as received data signals, and power supply means for said modifying means, said power supply means being connected to a plurality of said terminal connectors for receiving said control and data signals from said terminal apparatus for extracting voltage solely from said control and data signals whereby to provide power for generating said transmitted data signals for said transmission lines and for generating said received signals for said data terminal.

7. Apparatus according to claim 6 including capacitor storage means for storing a positive voltage extracted from said signals.

8. Apparatus according to claim 6 wherein said power supply means is arranged to extract a positive voltage and a negative voltage from said control and data signals and wherein there is provided capacitor storage means for storing said positive and negative voltages.

9. Apparatus according to claim 6 wherein the power supply means comprises a plurality of diodes and a corresponding plurality of capacitors, the diodes and capacitors being arranged such that the capacitors are charged so as to produce a plurality of different voltages of which at least one is positive and at least one is negative.

10. Apparatus according to claim 6 wherein said separate terminal connectors are arranged for connection to TXD, RTS, CTS, DTR and DSR connectors of a data terminal and wherein said power supply means is arranged to extract and store a negative voltage from said TXD connector and a positive voltage from said TXD, RTS and DTR connectors.

11. Apparatus according to claim 10 wherein said negative voltage is generated at a point connected on one side to ground through a capacitor and on the other side to said TXD connector through a first diode and wherein said positive voltage is generated at a point connected on one side to ground through a capacitor and on the other side to said TXD terminal connector through a second diode, to said RTS and CTS terminal connectors through a third diode and to said DTR terminal connector through a fourth diode.

* * * * *

REEXAMINATION CERTIFICATE (2564th)
United States Patent [19]
Dodds et al.

[11] B1 4,677,646

[45] Certificate Issued  May 9, 1995

[54] DATASET POWERED BY CONTROL AND DATA SIGNALS FROM DATA TERMINAL

[75] Inventors: David E. Dodds; Ludo Bertsch, both of Saskatoon, Canada

[73] Assignee: Saskatchewan Economic Development Corporation, Regina, Canada

Reexamination Requests:
No. 90/002,744, Jun. 3, 1992
No. 90/002,989, Mar. 10, 1993

Reexamination Certificate for:
Patent No.: 4,677,646
Issued: Jun. 30, 1987
Appl. No.: 761,390
Filed: Aug. 1, 1985

Related U.S. Application Data

[63] Continuation of Ser. No. 467,014, Feb. 16, 1983, Pat. No. 4,534,039.

[30] Foreign Application Priority Data

Feb. 26, 1982 [GB] United Kingdom ............... 8205660

[51] Int. Cl.⁶ ..................... H04B 3/00; H04L 25/00; H04M 11/00
[52] U.S. Cl. ..................... 375/36; 379/93; 379/348
[58] Field of Search ............ 375/36, 121; 455/343; 379/93

[56] References Cited

U.S. PATENT DOCUMENTS

4,415,774  11/1983  Driver ..................... 375/36

FOREIGN PATENT DOCUMENTS

2847066  5/1980  Germany.

OTHER PUBLICATIONS

Electronics Industries Assoc., EIA Standard RS-232-C, Oct. 1969.
Warrington, Brian, *Discover Data Communications*, Northwood Books, London (1980), p. 62 and FIG. 17.
DIN 66020 Standard, May 1981 (in German and with English translation).

*Primary Examiner*—Stephen Chin

[57] ABSTRACT

A dataset apparatus is powered by voltages extracted from electrical signals passing between the data terminal apparatus and the dataset by circuits comprising a capacitor and diode combination. The transmitter of the dataset includes capacitance isolation of the signal from the transmission lines by applying an oscillated voltage and an inverted oscillated voltage dependent upon the signal to capacitors in a first circuit to charge the capacitors through a diode whereby the oscillating voltage causes the capacitors to discharge through a second path formed by further diodes to charge a pair of capacitors coupled across the transmission lines. A second circuit of similar impedance to the first charges the capacitors to the opposite polarity. The arrangement can handle high common mode voltages on the transmission lines. The receiver of the dataset includes a doubly balanced resistance bridge network connecting the transmission lines to a differential amplifier, the circuit being balanced such that signals from the transmitter are not applied to the amplifier and also common mode signals are not applied to the amplifier.

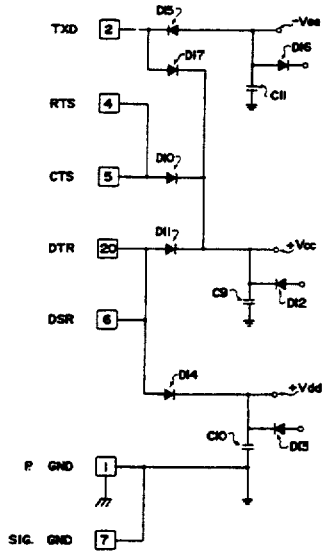

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6–11 is confirmed.

Claims 1–5 are cancelled.

* * * * *